United States Patent [19]

Stedman et al.

[11] 4,411,349

[45] Oct. 25, 1983

[54] CONVEYOR DEVICE USABLE AS BULKHEAD

[75] Inventors: Thomas R. Stedman, Elk Grove Village; Ronald A. Voyda, Des Plaines, both of Ill.

[73] Assignee: Walgreen Co., Deerfield, Ill.

[21] Appl. No.: 280,909

[22] Filed: Jul. 6, 1981

[51] Int. Cl.³ .............................................. B65G 67/00
[52] U.S. Cl. ................................. 193/35 R; 414/532; 414/534; 410/129; 193/37
[58] Field of Search ............. 193/35 R; 414/523, 532; 410/121, 92, 127, 129, 140

[56] References Cited

U.S. PATENT DOCUMENTS

| 2,904,196 | 9/1959 | Teixeira | 414/534 |
| 3,203,527 | 8/1965 | Daetwyler | 414/532 X |
| 3,894,646 | 7/1975 | Head et al. | 414/523 X |
| 3,915,275 | 10/1975 | Specht | 193/37 |
| 3,951,279 | 4/1976 | Jones | 193/35 SF X |

FOREIGN PATENT DOCUMENTS 499734 2/1954 Canada ............................. 410/129

Primary Examiner—Jeffrey V. Nase
Assistant Examiner—L. E. Williams
Attorney, Agent, or Firm—Charles F. Pigott, Jr.

[57] ABSTRACT

A conveyor device useful also as a bulkhead in a storage compartment for trucks, railroad cars and cargo holds in airplanes, boats and the like. The conveyor device comprises a frame having adjustable bar means carried by the frame, to be pressed against the walls of the storage compartment to secure the frame as a bulkhead across the width of the storage compartment. Article conveyor track means are removably carried by the frame. Typically, in the bulkhead mode the track means serve as part of the bulkhead wall, while during loading or unloading the track means may be used to convey articles.

10 Claims, 6 Drawing Figures

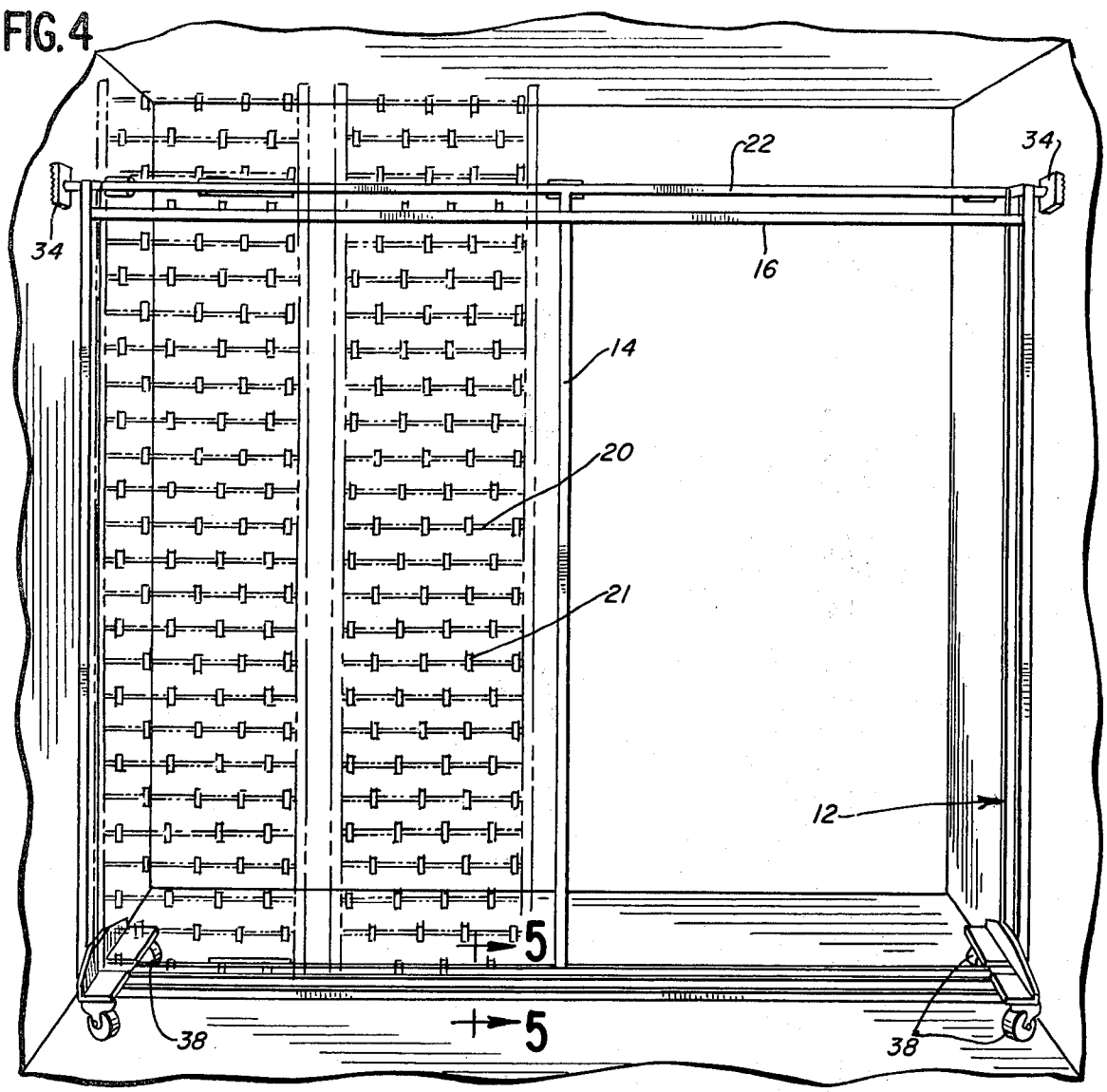
FIG. 4
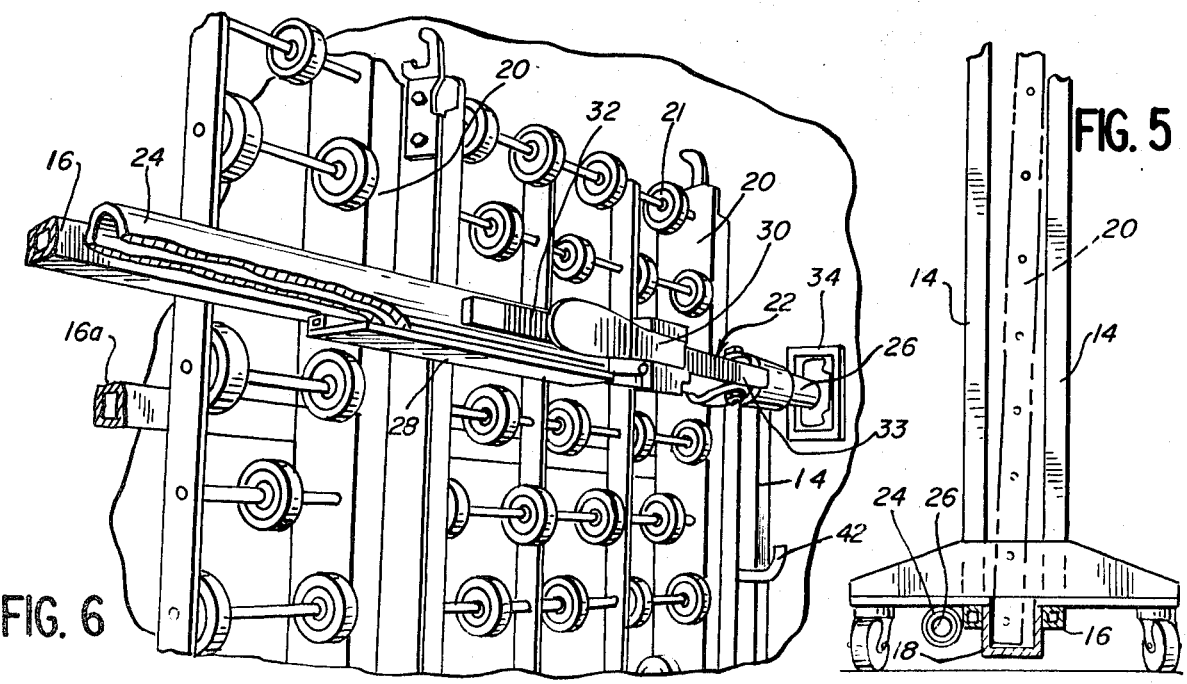
FIG. 6
FIG. 5

CONVEYOR DEVICE USABLE AS BULKHEAD

BACKGROUND OF THE INVENTION

Conveyor track members are often carried by trucks for facilitating the delivery of their cargo, particularly in the case where the cargo includes a large number of small members such as boxes. By means of these conveyor track members, the boxes may be placed one by one onto the conveyor tracks, which carry many rollers, so that the cargo boxes roll down the conveyor tracks to the ground outside of the truck, or even through a door into the storage room of the receiving facility. As one example of such a device, the Truck-a-Veyor conveyor system is offered for sale by Conveyit Inc. of La Canada, California, and is purportedly covered and described by U.S. Pat. No. 3,951,279.

The prior art conveyor systems, while useful, are rather bulky and cumbersome. For example, the above-described prior art conveyor system is suggested by the manufacturer to be carried underneath the bed of the truck, which, of course, requires special equipment and effort to initially attach the heavy device.

As another common problem in the transportation of cargo, when a truck or other cargo hold is only partially filled with cargo, it is frequently desirable to install a temporary bulkhead across a width of the storage compartment, to restrict the available space for the cargo so that it will not shift and slide as the truck or other vehicle maoves. Normal bulkheads are quite cumbersome, and it would be desirable to eliminate them or at least reduce their weight as much as possible.

In accordance with this invention, a cargo conveyor system for loading and unloading is provided in which the conveyor system is light, and requires no special equipment for installation and operation. At the same time, the conveyor device may be used as an adjustably positionable bulkhead in a cargo compartment, being easily set up into its bulkhead configuration, and then easily broken down to form a simple conveyor device which can be operated by one man. Thus the truck driver can easily do his own loading or unloading, without the need for special equipment, and with a net saving of weight, expense and space, since the device of this invention takes the place of conventional cargo conveyor apparatus as well as conventional bulkheads.

DESCRIPTION OF THE INVENTION

In accordance with this invention, a conveyor device is provided which is usable also as a bulkhead in a storage compartment. The conveyor device comprises a frame, and adjustable arm means carried by the frame to be pressed against the walls of the storage compartment, to secure the frame as a bulkhead across the width of the storage compartment. Furthermore, article conveyor track means may be removably carried by the frame, so that typically they constitute part of the bulkhead wall while carried by the frame, but may be removed for use in their conveyor track function when desired.

Typically the plurality of conveyor track members are removably carried by the frame in a rack defined between bar members of the frame. Also the bottom edges of the conveyor track members may be carried in a trough member of the frame, with the track members being preferably of such a length relative to the height of the storage compartment that their bottom edges may be lifted out of the trough member and removed for use without disconnection of the frame from its bulkhead-forming engagement with the wall of the storage compartment.

Typically, the adjustable bar means comprises at least one and preferably two adjustable-length horizontal bar members carried on the frame, with frictional gripping pad members positioned on each end of each bar member. One of the bar members is preferably positioned near the top and the other near the bottom of the frame, for firm retention. Three or more of such bar members may be used if desired.

The conveyor device preferably also has two pairs of casters, one caster at each corner of the device, to suppress tipping of the frame.

The conveyor track members may generally be of a convention design per se, defining a flat bed of rollers to allow articles to slide along an inclined track member by gravity, while the track mambers may be conventionally latchable together in an end-to-end connection for extension of the length of the sliding track.

In the drawings, FIG. 1 is an elevational view of the conveyor device of this invention, shown in its bulkhead-forming mode.

FIG. 4 is another elevational view of the conveyor device engaged in its bulkhead-forming relation, with some of the conveyor track members removed.

FIG. 5 is a sectional view taken along line 5—5 of FIG. 4.

FIG. 6 is a detailed perspective view of part of the device of this invention, showing details of the adjustable length horizontal bar member.

Figure 1:
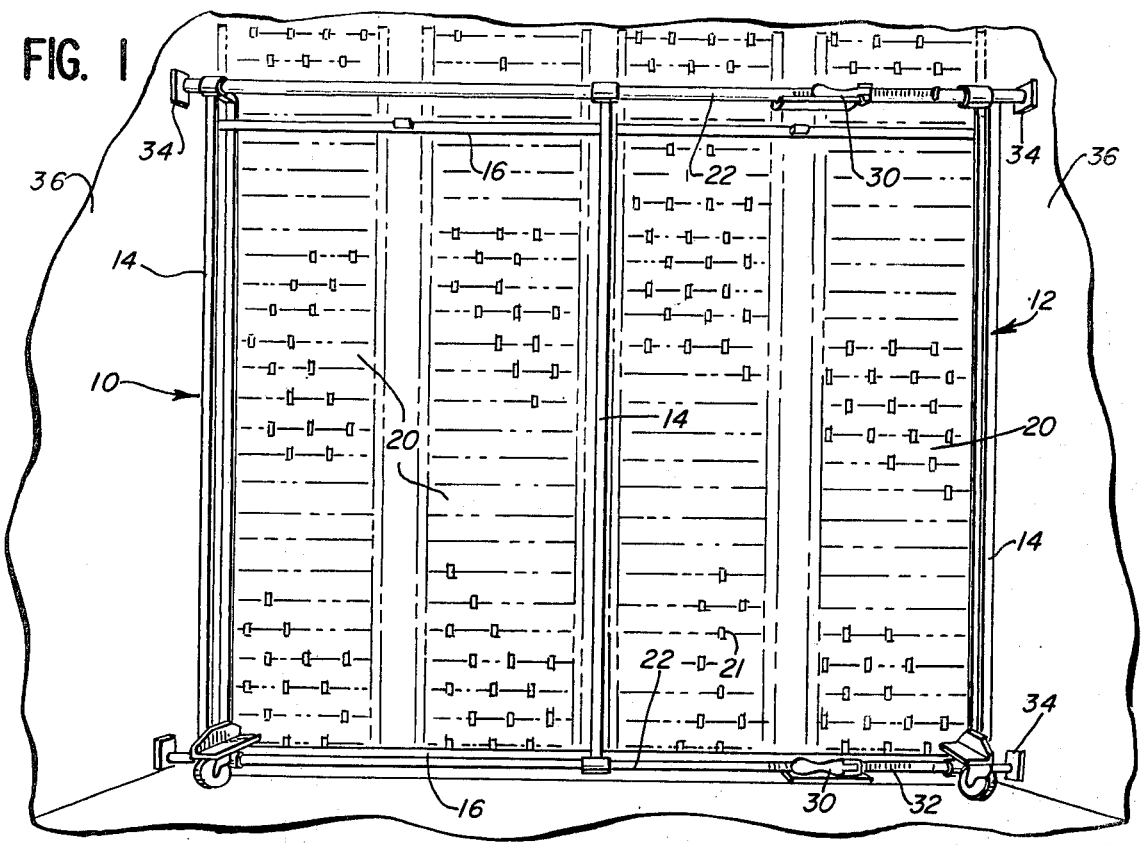

Referring to the drawings, FIG. 1 shows the conveyor device 10 of this invention, which is also usable as a bulkhead in a storage compartment. Frame 12 is shown including interconnected upright bars 14, cross bars 16, and a trough member 18 at the bottom thereof for receiving the bottom edges of the various conveyor track members 20, which may generally be of conventional design. However, track members 20 are typically shortened relative to the types which are conventionally commercially available, so that they may stand upright in the storage compartment, which typically may be of the normal height of a delivery truck, railroad car, or semi-trailer. Typically, conveyor track members 20 may be about 6½ feet in length as used in the contemplated embodiment of this invention, and are end-to-end connectable in conventional manner for extension of the length of the sliding track.

Each track member 20 as shown carries a large number of rollers 21 to facilitate the sliding of articles along its length.

Some crossbars 16 stand forward of crossbar 16a (FIG. 6) to create a slot between them into which the track members 20 can be removably inserted and retained in frame 12.

Frame 12 also carries a pair of adjustable length bar assemblies 22 which include a pair of telescoping bar members 24, 26 as shown in FIGS. 5 and 6. Outer bar member 24 carries pawl-type latch and handle member 30. Bar 26 telescopically slides in bar 24 and carries a toothed rack 32 attached to bar 26 at end 33, into which pawl-type latch 30 can engage to lock the respective bar members 24, 26 into differing telescoping positions relative to each other. Accordingly, the rubber friction feet 34 at each end of bar assemblies 22 may be adjustably extended outwardly through a range of positions so that they can press against the walls 36 of the compartment, to frictionally attach frame 12 as a bulkhead in place. This is easily cone by simple expansion of each horizontal bar assembly 22 until each of the feet 34 engage opposed walls, followed by latching of latch 30 to retain it in position. Thus frame 12 can be easily used as a bulkhead of adjustable positionability.

Plate 28 may be carried by a crossbar 16 to rest against handle 30 to prevent its rotation.

Figure 3:
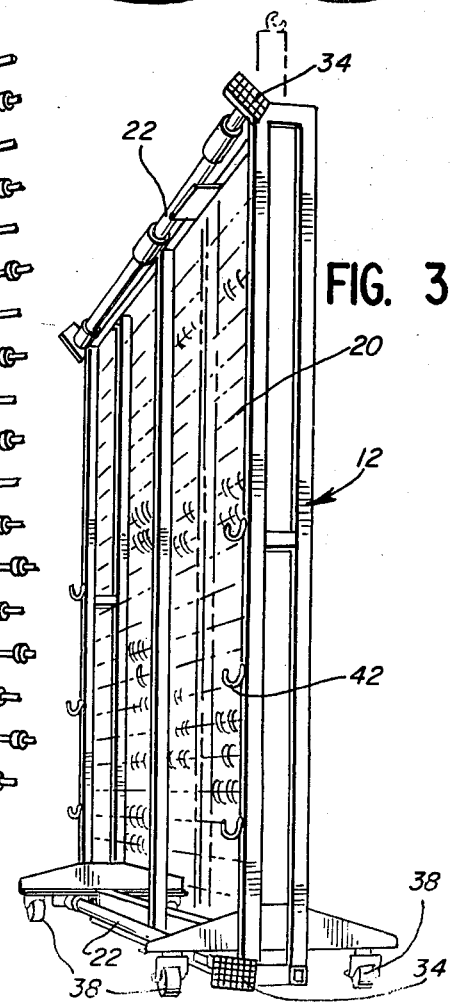
FIG. 3 is a perspective view of the conveyor device of this invention in its carrying mode, in which the device is not engaged in bulkhead-forming relation with the walls of the storage compartment.

Frame 12 may be carried by two pairs of casters 38 in which each of the casters are substantially laterally spaced on opposite sides of the central plane of the frame, as shown particularly in FIG. 3, to suppress tipping of the frame. Thus frame 12, in its use as a bulkhead, is easily rolled around for transport to the desired position by a single operator so that, as the deliveries proceed throughout the day and the cargo in the truck gets smaller and smaller, the adjustable bulkhead provided by frame 12 can be easily rolled back to restrict the space of a cargo of steadily decreasing size.

Figure 2:
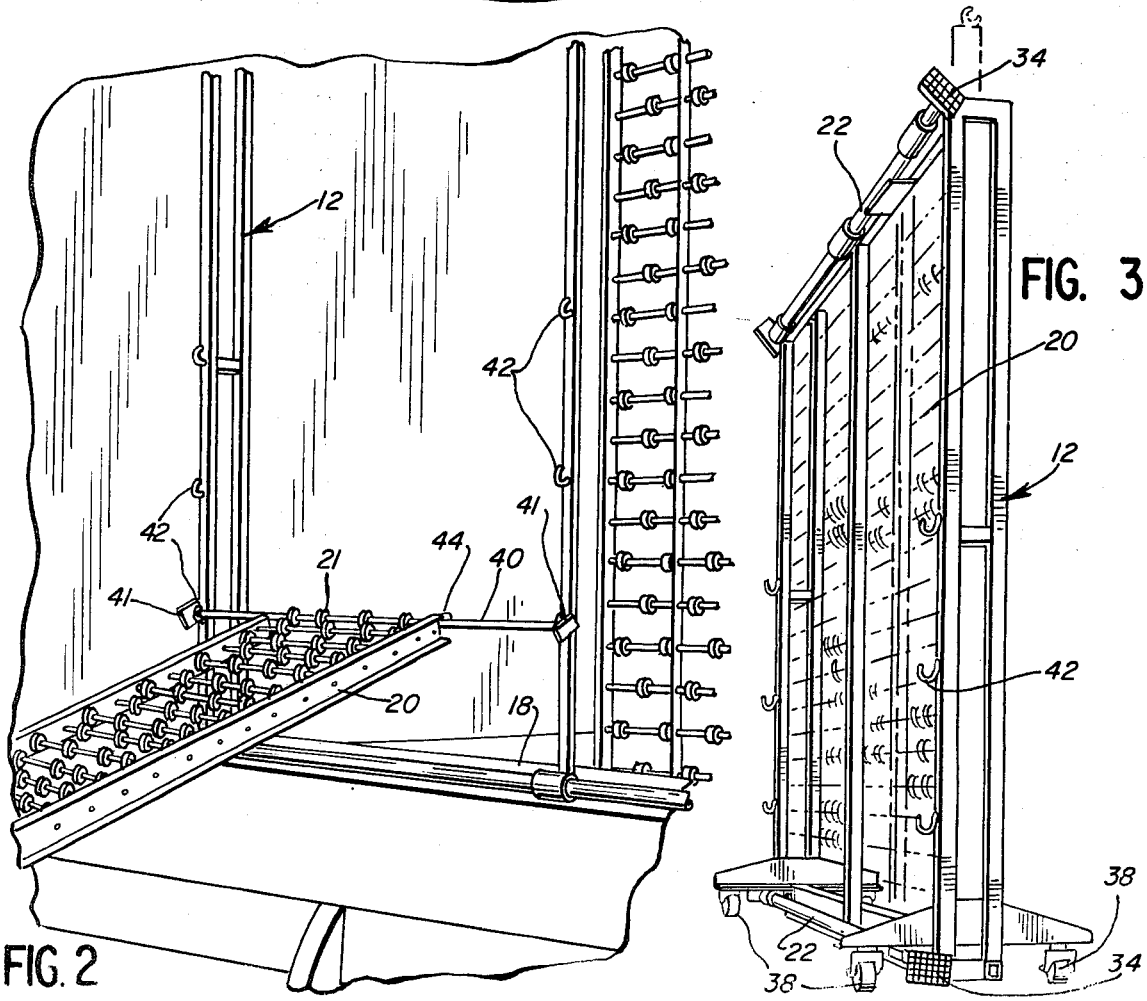
FIG. 2 is a fragmentary, perspective view of the conveyor device of this invention in which two of the track members have been removed and placed in a track-defining position for use.

As shown in FIG. 1, much of the wall of the bulkhead formed by the device of this invention is provided by the conveyor track members 20 in their carrying position. After the truck has reached a destination, any desired number of conveyor track members 20 may be lifted out of trough 18 and assembled into a sliding track, the upper end of which is shown in FIG. 2.

A crossbar 40, having end plates 41, may be provided to rest in pairs of hooks 42 of varying height carried on frame 12, so that a track member 20 may hook with hooks 44 onto bar 40, which rests in any of the pairs of hooks 42 at varying heights. Thus the track members may be connected in article-conveying position to frame 12 at variable angles of inclination, for proper adjustment of the rate of gravity-impelled transit of the various articles along the conveyor track.

Accordingly, the device of this invention provides the desired connectable track members 20 to facilitate loading and unloading, while at the same time the track members can be conveniently stored in frame 12 to serve as an adjustable bulkhead while being so stored.

The above has been offered for illustrative purposes only, and is not intended to limit the scope of the invention of this application, which is as defined in the claims below.

What is claimed is:

1. A conveyor device usable also as a bulkhead in a storage compartment, which comprises: a frame, adjustable bar means carried by said frame to be pressed against the walls of said storage compartment to secure said frame as a bulkhead across a width of said storage compartment, at least one conveyor track member removably carried by said frame and having article conveyor means mounted thereon, said at least one track member and said article conveyor means forming at least one unit that is removable as a unit from said frame.

2. The conveyor device of claim 1 in which a plurality of conveyor track members are removably carried by said frame in a rack defined between bar members of said frame.

3. The conveyor device of claim 1 in which said adjustable bar means comprises at least one adjustable length horizontal bar member carried on said frame, and frictional gripping pad members positioned on each end of said bar member.

4. The conveyor device of claim 1 in which said article conveyor means define a flatbed of rollers to allow articles to slide along an inclined track member by gravity.

5. The conveyor device of claim 4 in which said track members are end-to-end connectable for extension of the length of the sliding track.

6. A conveyor device usable also as a bulkhead in a storage compartment, which comprises: a frame, at least one adjustable-length horizontal bar member carried on said frame to be pressed at its ends against opposed walls of the storage compartment to secure said frame as a bulkhead across the width of the storage compartment, frictional gripping pad members positioned on each end of said bar member, and a plurality of end-to-end connectable conveyor track members removably carried by the frame in a space defined between generally vertical bar members of said frame, said track members having article conveyor means mounted thereon, said track members forming at least one unit that is removable as a unit from said frame.

7. The conveyor device of claim 6 in which said conveyor track members define a flatbed of rollers to allow articles to slide along an inclined track member by gravity.

* * * * *